United States Patent
Chen et al.

(10) Patent No.: US 11,304,122 B2
(45) Date of Patent: Apr. 12, 2022

(54) ON-DEMAND SYSTEM INFORMATION REQUEST PROCEDURE AND ERROR HANDLING

(71) Applicant: FG Innovation Company Limited, Tuen Mun (HK)

(72) Inventors: Hung-Chen Chen, Taipei (TW); Chie-Ming Chou, Taipei (TW); Yung-Lan Tseng, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 38 days.

(21) Appl. No.: 16/992,482

(22) Filed: Aug. 13, 2020

(65) Prior Publication Data
US 2020/0374782 A1 Nov. 26, 2020

Related U.S. Application Data

(63) Continuation of application No. 16/372,389, filed on Apr. 1, 2019, now Pat. No. 10,791,502.
(Continued)

(51) Int. Cl.
| | |
|---|---|
| *H04W 4/00* | (2018.01) |
| *H04W 48/14* | (2009.01) |
| *H04W 48/16* | (2009.01) |
| *H04W 76/18* | (2018.01) |
| *H04W 36/30* | (2009.01) |
| *H04W 76/15* | (2018.01) |
| *H04W 36/08* | (2009.01) |
| *H04W 74/08* | (2009.01) |
| *H04W 76/28* | (2018.01) |

(52) U.S. Cl.
CPC ............ *H04W 48/14* (2013.01); *H04W 36/08* (2013.01); *H04W 36/305* (2018.08); *H04W 48/16* (2013.01); *H04W 76/15* (2018.02); *H04W 76/18* (2018.02); *H04W 74/0833* (2013.01); *H04W 76/28* (2018.02)

(58) Field of Classification Search
CPC ..... H04W 48/14; H04W 48/16; H04W 76/18; H04W 36/305; H04W 76/15; H04W 36/08; H04W 74/0833; H04W 76/28
USPC .......................................... 455/434; 370/338
See application file for complete search history.

(56) References Cited

U.S. PATENT DOCUMENTS

| | | | |
|---|---|---|---|
| 2019/0124715 A1* | 4/2019 | Chen | ..................... H04W 76/11 |
| 2019/0215858 A1* | 7/2019 | Ishii | ..................... H04W 48/14 |

(Continued)

FOREIGN PATENT DOCUMENTS

| | | |
|---|---|---|
| WO | 2017/135051 A1 | 8/2017 |
| WO | 2018/014728 A1 | 1/2018 |

OTHER PUBLICATIONS

Oppo, "Discussion on SI Request Prohibit Timer", R2-1801795, 3GPP TSG-RAN WG2#101, Athens, Greece, Feb. 26-Mar. 2, 2018.
(Continued)

*Primary Examiner* — Marcos Batista
(74) *Attorney, Agent, or Firm* — ScienBiziP, P.C.

(57) ABSTRACT

A method of wireless communications performed by a user equipment (UE) is provided. The method includes performing an on-demand system information (SI) request procedure in a cell; and performing an error handling procedure if the on-demand SI request procedure in the cell is unsuccessful. The error handling procedure includes storing SI request failure information.

20 Claims, 7 Drawing Sheets

Related U.S. Application Data

(60) Provisional application No. 62/651,312, filed on Apr. 2, 2018.

(56) References Cited

U.S. PATENT DOCUMENTS

2019/0223082 A1 7/2019 He et al.
2021/0068156 A1 3/2021 Suzuki et al.

OTHER PUBLICATIONS vivo, "Failure Handling for On Demand SI Acquisition Procedure", R2-1802093, 3GPP TSG RAN WG2 Meeting #101, Athens, Greece, Feb. 26-Mar. 2, 2018.
Huawei, HiSilicon, "Failure handling for on-demand SI acquisition", R2-1803366, 3GPP TSG-RAN WG2#101, Athens, Greece, Feb. 26-Mar. 2, 2018.

* cited by examiner

ON-DEMAND SYSTEM INFORMATION REQUEST PROCEDURE AND ERROR HANDLING

CROSS-REFERENCE TO RELATED APPLICATION(S)

This application is a continuation application of U.S. patent application Ser. No. 16/372,389, filed on Apr. 1, 2019, which claims the benefit of and priority to a provisional U.S. Patent Application Ser. No. 62/651,312, filed on Apr. 2, 2018. The contents of all above-named applications are fully incorporated herein by reference for all purposes.

FIELD

The present disclosure generally relates to wireless communication, and more particularly, to the on-demand system information (SI) request procedure for the next generation wireless communication networks.

BACKGROUND

The concept of on-demand System Information (SI) request has been introduced in the next generation wireless network (e.g., a $5^{th}$ generation (5G) new radio (NR) network). When a UE finds that a required SI message(s) is not broadcasted, based on information in the System Information Block Type 1 (SIB1) (e.g., a one-bit indicator that shows whether the corresponding SI message is currently broadcasted or not) and the mapping of the SIBs to SI messages, the UE may perform an on-demand SI request procedure to ask the network (also referred to as NW) to broadcast the required SIB(s) and/or SI message(s). However, the next generation wireless network lacks an efficient mechanism for error handling associated with the on-demand SI request procedure.

SUMMARY

The present disclosure is directed to on-demand system information request procedure and the corresponding error handling procedure for the next generation wireless communication networks.

According to an aspect of the present disclosure, a method of wireless communications performed by a user equipment (UE) is provided. The method includes performing an on-demand system information (SI) request procedure in a first cell; and performing an error handling procedure if the on-demand SI request procedure in the first cell is unsuccessful. The error handling procedure includes storing SI request failure information.

The method includes According to another aspect of the present disclosure, a UE is provided. The UE includes one or more non-transitory computer-readable media having computer-executable instructions embodied thereon and at least one processor coupled to the one or more non-transitory computer-readable media. The at least one processor is configured to execute the computer-executable instructions to transmit a first system information (SI) request message to a base station (BS) on a signaling radio bearer 1 (SRB1) after determining that the UE is in a connected state, the first SI request message indicating at least one requested system information block (SIB); transmit a second SI request message to the BS on a signaling radio bearer 0 (SRB0) after determining that the UE is not in the connected state, the second SI request message indicating at least one requested SI message; and perform an error handling procedure after determining that any of the at least one requested SIB or the at least one requested SI message is not successfully received.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

DETAILED DESCRIPTION

Figure 1:
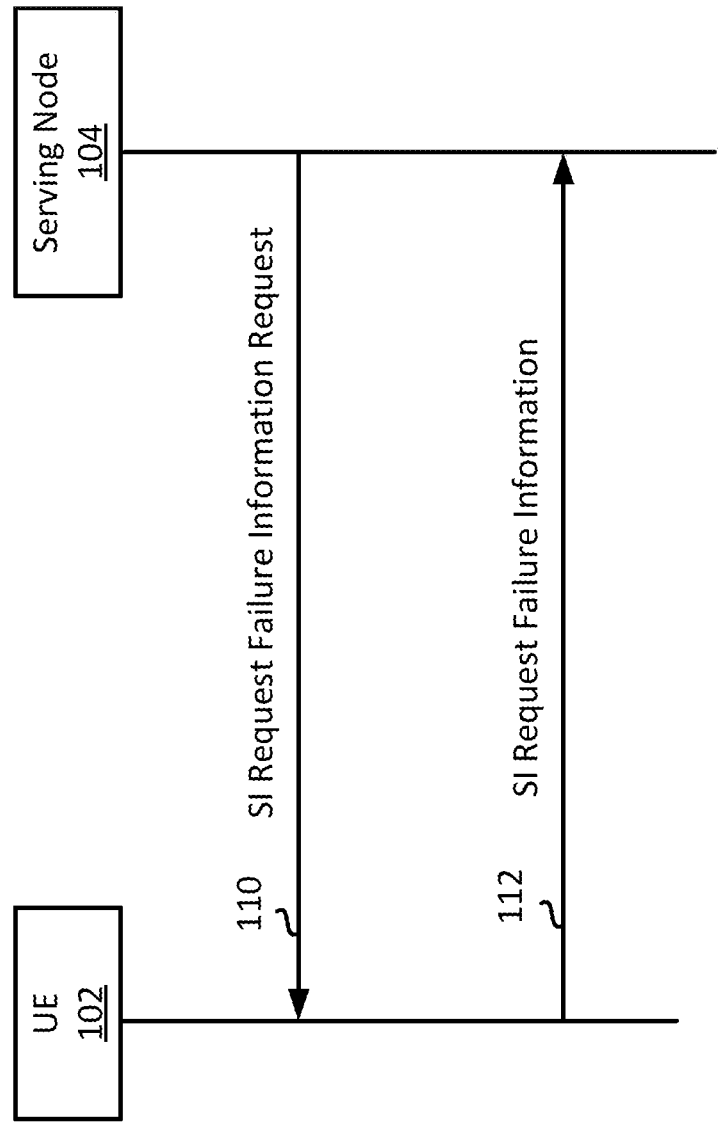
FIG. 1 is a sequence diagram illustrating the transmission of SI request failure information, according to an exemplary implementation of the present application.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the exemplary figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the exemplary implementations described in this specification are oriented to software installed and executing on computer hardware, nevertheless, alternative exemplary implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD-ROM), magnetic cassettes, magnetic tape, magnetic disk storage, or any other equivalent medium capable of storing computer-readable instructions.

A radio communication network architecture (e.g., a long term evolution (LTE) system, a LTE-Advanced (LTE-A) system, a LTE-Advanced Pro system, or a 5G New Radio (NR) Radio Access Network) typically includes at least one base station, at least one user equipment (UE), and one or more optional network elements that provide connection towards a network. The UE communicates with the network (e.g., a core network (CN), an evolved packet core (EPC) network, an Evolved Universal Terrestrial Radio Access network (E-UTRAN), a 5G Core (5GC), or an internet), through a radio access network (RAN) established by one or more base stations.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a personal digital assistant (PDA) with wireless communication capability. The UE is configured to receive and transmit signals over an air interface to one or more cells in a radio access network.

A base station may include, but is not limited to, a node B (NB) as in the UMTS, an evolved node B (eNB) as in the LTE-A, a radio network controller (RNC) as in the UMTS, a base station controller (BSC) as in the GSM/GERAN, a ng-eNB as in an E-UTRA base station in connection with the 5GC, a next generation node B (gNB) as in the 5G-RAN, and any other apparatus capable of controlling radio communication and managing radio resources within a cell. The base station may connect to serve the one or more UEs through a radio interface to the network.

A base station may be configured to provide communication services according to at least one of the following radio access technologies (RATs): Worldwide Interoperability for Microwave Access (WiMAX), Global System for Mobile communications (GSM, often referred to as 2G), GSM EDGE radio access Network (GERAN), General Packet Radio Service (GRPS), Universal Mobile Telecommunication System (UMTS, often referred to as 3G) based on basic wideband-code division multiple access (W-CDMA), high-speed packet access (HSPA), LTE, LTE-A, eLTE (evolved LTE), New Radio (NR, often referred to as 5G), and/or LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting proximity service (ProSe) or Vehicle to Everything (V2X) service. Each cell may have overlapped coverage areas with other cells.

As discussed above, the frame structure for NR is to support flexible configurations for accommodating various next generation (e.g., 5G) communication requirements, such as enhanced mobile broadband (eMBB), massive machine type communication (mMTC), ultra reliable communication and low latency communication (URLLC), while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) low-density parity-check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resource may also be provided in a NR frame to support ProSe services or V2X services.

The 3rd Generation Partnership Project (3GPP) has introduced a new radio resource control (RRC) state (i.e., the RRC INACTIVE state) for the next generation (e.g., 5th generation (5G)) wireless communication networks. The RRC INACTIVE state (also referred to as inactive state in the following description) aims to achieve power saving with acceptable access latency, and is suitable especially for small data transmission, such as in machine type communications (MTC) scenarios. When a UE is in an inactive state, the 5G radio access network (5G-RAN) (e.g., the next generation radio access network (NG-RAN), other 3GPP/non-3GPP access network connected to a 5G core network) and the UE store the "UE context" (which may include Access Stratum (AS) context and Non-Access Stratum (NAS) context of the UE) separately. In addition, when the UE is in the inactive state, the UE may not have an RRC connection with the 5G-RAN, although the 5G-RAN may keep a connection with the next generation core network (e.g., 5G Core Network (5GC)).

The on-demand SI request procedure may be implemented differently for the UEs that are in different Radio Resource Control (RRC) states. For example, in one implementation, for a UE that is in a connected state, the NW may deliver on-demand SI messages or SIB(s) via dedicated signaling to the UE after receiving an SI request from the UE. In some implementations, for a UE that is in an idle state or an inactive state, the NW may deliver on-demand SI messages or SIB(s) via broadcasting. In some implementations, the NW may control the message type for the on-demand SI request procedure. For example, the message type for the on-demand SI request procedure may include a Message 1 (MSG1) based approach and a Message 3 (MSG3) based approach.

In some of the present embodiments, if a Random Access (RA) preamble and/or a Physical Random Access Channel (PRACH) resource specific to each SIB or set of SIBs (which the UE needs to acquire) is included in the minimum SI (e.g., in the Master Information Block and the SIB1), the SI request may be indicated using an MSG 1-based approach.

In an MSG1-based SI request, in some implementations, the minimum granularity for a requested SI may be one SI message (for a set of SIBs, as in an LTE scenario). In some of such implementations, one RA preamble may be used to request for multiple SI messages. In some implementations, a Random Access Preamble Index (RAPID) may be included in a Message 2 (MSG2). Other fields, such as Timing Advance (TA), UL grant and Temporary Cell Radio Network Temporary Identifier (C-RNTI), may not be included in the MSG2 in some implementations.

In some of the present embodiments, an RA procedure for SI request may be considered successful when the UE receives an MSG2 that includes a RAPID corresponding to the transmitted preamble. The MSG2 reception may use an RA-RNTI that corresponds to the MSG1 transmitted by the UE.

In some of the present embodiments, the UE may retransmit the RA preamble according to an NR RA power ramping when the SI request is considered to be unsuccessful. The MSG1 for SI request re-transmission may be continued until reaching maximum preamble transmissions in some of the present embodiments. Thereafter, an RA problem may be indicated to the upper layer (e.g., RRC layer). In some of the present embodiments, a Back off mechanism may be applicable to the MSG1-based SI requests. In some of such embodiments, however, no special back off sub-header/procedure may be required.

In some of the present embodiments, if the RA preamble and/or the PRACH resource (or PRACH occasions) specific to each SIB or set of SIB s (which the UE needs to acquire) is not included in the minimum SI, the SI request may be included in an MSG3. The UE may determine whether the MSG3-based approach is successful or not based on a reception of the MSG4. The preamble(s) and/or the PRACH occasions for the SI request using the MSG3-based approach may not be reserved in some aspects of the present embodiments. RRC signaling may be used for the SI request in an MSG3-based approach. In some embodiments, the UE's ID may not be included in the MSG3.

In some of the present embodiments, a temporary C-RNTI received in the MSG2 may be used for an MSG4 reception. The UE may check the contention resolution Medium Access Control (MAC) Control Element (CE) against the transmitted request.

Specifically, based on the MSG1-based SI request procedure, a UE which transmits a preamble on a dedicated PRACH resource (or PRACH occasions) for the SI request may need to wait for a corresponding Random Access Response (RAR) within a configured RAR window. If no RAR that contains a RAPID corresponding to the transmitted preamble is received, the UE may retransmit the RA preamble until the corresponding RAR is received. The MSG1 for SI request re-transmission, in some of the present embodiments, may be continued until a maximum preamble transmission is reached. In some of such embodiments, an RA problem may be indicated to the upper layers. However, during the whole MSG1-based SI request procedure, the requested SIB(s) or SI message(s) may be broadcasted based on the NW decision or other UE's SI request(s). There may be a power consumption issue if the UE does not stop the ongoing MSG1-based SI request procedure when the required SIB(s) has been broadcasted.

As described above, based on the MSG1-based SI request procedure, a UE which transmits a preamble on a dedicated PRACH resource for the SI request may need to wait for the corresponding RAR within a configured RAR window. If no RAR that contains a RAPID corresponding to the transmitted preamble is received, the UE may retransmit the RA preamble until reaching a maximum preamble transmission, and then an RA problem may be indicated to upper layers. If the corresponding RAR is received, the UE may send an MSG3 to indicate the required SIB(s) and/or SI message(s). After sending the MSG3, the UE may need to wait for a period e.g., defined by a contention resolution timer) for receiving the MSG4 for contention resolution. If the contention resolution timer expires and no MSG4 is received, the UE may retransmit a preamble again. In some of the present embodiments, the MSG1 for the SI request re-transmission may be continued until a maximum preamble transmission is reached. In some aspects of the present embodiments, an RA problem may be indicated to the upper layers. Similarly, since contention resolution is also adopted for the MSG3-based SI request procedure, an RA problem may be indicated to the upper layers if the maximum preamble transmission is reached.

CASE 1: A UE's behaviour when an on-demand SI request is unsuccessful for the UE in an idle state or an inactive state:

When an MSG1-based SI request or an MSG3-based SI request procedure in a cell is failed, the UE may consider the cell as barred, or may consider that the required SIB(s) and/or SI message(s) are not available. In one implementation, the UE may consider the on-demand SI request procedure as unsuccessful when the number of times the UE transmits a random access preamble reaches a threshold (e.g., maximum allowable preamble transmissions), and/or the UE receives SI request rejection information (e.g., in a RAR) in some of the present embodiments.

If the UE considers that a cell is barred due to an SI request failure, the UE may consider the cell as barred for a configurable time period or a fixed time period (e.g., for 300 s). The UE may perform a cell reselection procedure to find another cell to camp on. The barring time period may be broadcasted to the UE in system information, carried in an MSG2 or MSG4, or may be predefined as a fixed value in some of the present embodiments.

If the UE considers that the required SIB(s) and/or SI message(s) are not available, the UE may not perform the SI request for the unavailable SIB(s) and/or SI message(s) again on the cell. In some of the present embodiments, when the UE considers that the required SIB(s) and/or SI message(s) are not available (e.g., when an RA procedure problem is reported, or when SI request rejection information is received), the UE may activate a prohibit timer. In some of such embodiments, the UE may avoid initiating another on-demand SI request procedure until the prohibit timer expires. In one implementation, the UE is forbidden to perform another on-demand SI request procedure until the prohibit timer expires. For example, the prohibit timer may start when an upper layer (e.g., the RRC layer) receives the SI request rejection information, or receives the RA problem due to an SI request failure from a lower layer (e.g., the MAC layer). After the prohibit timer expires, the UE may initiate another SI request procedure. The prohibit timer may be preconfigured or may be a fixed value in some of the present embodiments. The value of the prohibit timer may be broadcasted in system information, carried in an MSG2 or MSG4, or may be predefined as a fixed value in some embodiments.

In one implementation, if the prohibit timer is not present in the signaling from the NW, it is up to UE's implementation on when to start the SI request procedure again.

In one implementation, the UE may determine whether to perform a cell reselection procedure due to a failure of the MSG1-based SI request or the MSG3-based SI request. The UE may make such a determination based on whether the required SIB(s) and/or SI message(s) are essential for the UE (e.g. essential for the UE's targeting services) or based on some other predefined rules. For example, the UE may determine to perform a cell reselection procedure as a result of an unsuccessful SI request if the required SIB(s) and/or SI message(s) are essential.

The UE may perform a cell reselection procedure due to a failure of the MSG1-based SI request or the MSG3-based SI request. Specifically, when the UE performs a cell reselection procedure, the UE may consider the cell, for which the UE fails to request the required SIB(s) and/or SI messages(s), as barred or having a lower priority (e.g., by setting the priority of the frequency on which the barred cell is to a default value). In one implementation, the requested SIB(s) and/or SI messages(s) may be defined/considered as the essential SI for different UE categories or UE types. If the requested SIB(s) and/or SI messages(s) are not defined/considered as the essential SI for the category or type of the UE, the UE may decide whether to re-request the requested SIB(s) or SI messages(s) on the camped cell. In one implementation, if the requested SIB(s) or SI messages(s) are not defined/considered as the essential SI for the category or type of the UE, a prohibit timer may start when the upper layer (e.g., the RRC layer) receives the RA problem due to an SI request failure from the lower layer (e.g., the MAC layer). After the prohibit timer expires, the UE may perform the SI request procedure again. The prohibit timer may be preconfigured or be a fixed value. The value of the prohibit timer may be broadcasted in the system information, carried in an MSG2 or MSG4, or may be predefined as a fixed value.

CASE 2: A UE's behaviour when the on-demand SI request is unsuccessful for the UE in a connected state:

A UE may also request the required SIB(s) or SI message(s) while the UE is in a connected state. Normally, the UE may receive the required SIB(s) or SI message(s) via dedicated signaling. If the UE does not receive the required SIB(s) or SI message(s) via dedicated signaling, (e.g., no response from the NW side to deliver the required SIB(s) or SI message(s), or receiving SI request rejection information), the UE may consider that there is an NW error and perform reestablishment to another qualified cell if there is another qualified cell with a valid UE context. If there is no such a qualified cell or if the reestablishment is rejected/failed, the UE may switch to an idle state and perform a cell reselection procedure by considering the cell as barred. In another implementation, the UE may directly switch to the idle state and then perform a cell reselection procedure by considering the cell as barred.

In one implementation, the NW may respond an SI request rejection message/information to the UE. After receiving the SI request rejection message/information, the UE may consider that the required SIB(s) or SI message(s) are not available and may not perform the SI request for those SIB(s) or SI message(s) again on the cell. In another implementation, a prohibit timer may be initiated when the UE receives the SI request rejection message/information. After the prohibit timer expires, the UE may perform an SI request procedure again. The prohibit timer may be preconfigured or may be a fixed value.

In one implementation, when the SI request procedure is unsuccessful, the UE may perform, at least, a reestablishment procedure, switch to an idle state for a cell reselection procedure, mark that the requested SIB(s) or SI message(s) are not available, etc.

In one implementation, the requested SIB(s) or SI messages(s) may be defined/considered as the essential SI for different UE categories or UE types. The UE may switch to the idle state and perform a cell reselection procedure when the SI request for essential SI is failed. The UE may consider the cell in which the SI request is failed as barred, or having a lower priority when performing a cell reselection procedure (e.g., by setting the priority of the frequency on which the barred cell is to a default value). The UE, in some of the present embodiments, may only mark that the requested SIB(s) or SI message(s) are not available when the SI request for non-essential SI is failed.

In the connected state, the NW may perform a handover (HO) procedure (e.g., from a source gNB to a target gNB) when receiving the SI request for required SIB(s) or SI message(s) that are not provided by the NW. The target gNB may provide the required SIB(s) or SI message(s) in the HO command (e.g., based on the SI request information provided in the HO Request message from the source gNB).

In the Dual Connectivity (DC) mode, the UE may inform the cause of a Secondary Node (SN) SI request failure, or the information related to the SI request failure to a Master Node (MN) when the on-demand SI request for the SIB(s) of the SN is rejected or failed. After the MN receives the cause of an SI request failure or the information related to the SI request failure, in some of the present embodiments, the MN may try to resolve the SN SI request rejection/failure problem. For example, in one aspect of the present embodiments, the MN may release the SN or change the SN to a new SN for the UE.

CASE 3: Store and report the information related to the SI request failure:

An MSG1-based SI request or an MSG3-based SI request procedure may be failed when a lower layer (e.g., the MAC layer) informs an upper layer (e.g., the RRC layer) of an RA problem. Since the RRC layer knows the RA procedure is triggered for the SI request, the UE may store the SI request failure information. The SI request failure information may include one or more parameters used in the on-demand SI request procedure. The SI request failure information may include at least one of the following: the on-demand SIB(s) requested by the UE, the on-demand SI message(s) requested by the UE, the cell ID (of the cell in which the UE has performed the SI procedure but has failed), SSB Index(s) (Synchronization Signal Block Index(s)) to perform the SI request procedure, the message type of the failed SI request procedure (e.g., MSG1-based or MSG3-based), the timestamp (e.g., when to perform the SI request procedure), etc. The SSB Index may indicate which SSB with RA resource (or RA occasions) is used for a preamble transmission. For example, for an MSG1-based approach, the dedicated RA resource (or RA occasions) for transmitting a preamble may be associated with an SSB. For an MSG3-based approach, the common RA resource (or RA occasions) for transmitting a preamble may be associated with an SSB. The UE may report such failure information to the NW when switching to a connected state later. The UE may mandatorily report the information of the SI request failure, according to the configuration, or upon an NW request. The content of the SI request failure information may be predefined, may be based on the required information indicated in the received SI request failure information message, or may be based on the configuration.

FIG. 1 is a sequence diagram illustrating the transmission of SI request failure information, according to an exemplary implementation of the present application. As shown in diagram 100, in action 110, serving node 104 (e.g., a gNB) may send a request to UE 102 to provide the information related to SI request failure. For example, serving node 104 may send an SI Request Failure Information Request message to UE 102 if UE 102 informs serving node 104 that such information is stored. In one implementation, UE 102 may set one bit in an RRC message (e.g., in the RRC Connection Setup Complete message or in the RRC Connection Resume message) to true (or '1') to inform serving node 104 that UE 102 supports storage of the SI request failure information and it has the SI request failure information stored. Serving node 104 may determine to request the SI request failure information after receiving such information from UE 102. In action 112, UE 102 may send a message including the SI request failure information to serving node 104.

By utilizing the SI request failure information, serving node 104 may know how to adjust the SI request mechanism between the MSG1-based approach and the MSG3-based approach. For example, if UE 102 reports failure of an MSG3-based SI request procedure in a cell or a certain area, serving node 104 may consider adopting the MSG1-based SI request for the UEs in idle/inactive state to avoid an RA collision by using the dedicated RA resource(s) for SI request. Alternatively, serving node 104 may continue to adopt the MSG3-based SI request procedure when UE 102 reports the failure of the MSG3-based SI request procedure.

In one implementation, UE 102 may store the information related to the SI request failure when UE 102 considers the cell as barred and performs a cell reselection procedure. UE 102 may not store the information related to the SI request failure when UE 102 considers that the required SIB(s) or SI message(s) are not available.

When the SI request procedure for a UE that is in a connected state is failed (e.g., UE 102 does not receive the required SIB(s) or SI message(s) via dedicated signaling, or UE 102 receives the SI request rejection information), UE 102 may store the information of the SI request failure. In one implementation, when the SI request procedure is unsuccessful, UE 102 may perform re-establishment to another qualified cell, or UE 102 may switch to an idle state and then perform a cell reselection procedure by considering the cell as barred. The information of the SI request failure may include at least one of the following: the required SIB(s), the required SI message(s), the cell ID (of the cell in which the UE preforms SI procedure but failed), and the timestamp of the SI request procedure. UE 102 may report such failure information to the NW when switching to a connected state later. UE 102 may mandatorily report the information of the SI request failure, according to the configuration, or upon receiving an NW request. The content of the SI request failure information may be predefined, may be based on the required information indicated in the received SI request failure information message, or may be based on the configuration.

Similarly, UE 102 may store the SI request failure information when UE 102 is in a connected state if the SI request is unsuccessful (where SI request procedure may be an MSG1-based SI approach or an MSG3-based SI approach). The SI request failure information may include at least one of the following: the on-demand SIB(s) requested by UE 102, the on-demand SI message(s) requested by UE 102, the cell ID (of the cell which UE 102 preforms SI procedure but failed), SSB Index(s) (Synchronization Signal Block Index(s)) to perform the on-demand SI request procedure, the message type of the unsuccessful SI request procedure (e.g., MSG1-based or MSG3-based), and the timestamp (e.g., when to perform the SI request procedure). The UE may mandatorily report the SI request failure information, according to the configuration, or by an NW request (e.g., requested by serving node 104). The content in the SI request failure information may be predefined, may be based on the required information indicated in the received SI Request Failure Information message, or may be based on the configuration.

It may be beneficial for the NW to know the information related to SI request failure. For example, the NW may determine which cell, SIB(s)/SI message(s), or the related dedicated preamble may have problems. As a result, the NW is likely to overcome the problem afterwards, or the NW may consider adopting another mechanism for serving the SI request.

In the DC mode, a UE may inform the cause of a Secondary Node (SN) SI request failure, or the information related to the SI request failure, to a Master Node (MN) when the on-demand SI request for the SIB(s) of the SN is rejected or failed. After MN receives the cause of the SI request failure or the information related to the SI request failure, the MN may try to resolve the SN's SI request rejection/failure problem. For example, the MN may release the SN or change the SN to a new SN for the UE.

CASE 4: Harmonization of the SI Request messages in idle, inactive, and connected states:

For an MSG3-based SI request procedure, the MSG3 may include an SI request message (which may be an RRC message) containing no UE ID. In an idle state, there may be no security key and/or security algorithm configured to the UE yet. Therefore, the SI request message transmitted in an idle state may be transmitted on Signaling Radio Bearer 0 (SRB0). Neither integrity protection, nor ciphering, apply to the SRB0 in some embodiments. In one implementation, the SI request message (which is an RRC message) may be the same for idle, inactive, and connected states, resulting in an RRC message harmonization. The SI request message may be transmitted on the SRB0 without integrity protection and ciphering, even if the UE is in a connected state, or in an inactive state, where integrity protection and ciphering may have been already applied.

In one implementation, the SI request message (which is an RRC message) that includes no UE ID may be the same for idle, inactive, and connected states. The UE may transmit the SI request message on the SRB0 when the UE is in an idle or an inactive state. The UE may transmit the SI request message on Signaling Radio Bearer 1 (SRB1) when the UE is in a connected state. Both integrity protection and ciphering may apply to the SRB1.

In one implementation, the SI Request message (which is an RRC message) may be the same for idle, inactive, and connected states. The UE may transmit the SI request message on the SRB0 when the UE is in an idle state. The UE may transmit the SI request message on the SRB1 when the UE is in an inactive or a connected state. Both integrity protection and ciphering may apply to the SRB1. In an inactive State, the UE may still have the UE context and the NW's configuration for integrity protection and ciphering.

In one implementation, whether the SI request message is transmitted on the SRB0 or the SRB1 for a UE in an inactive state may be determined based on the UE's implementation, the NW's preconfiguration, and/or whether the UE context for integrity protection and ciphering is stored/valid or not.

It may be beneficial to keep the commonality of the SI Request message with respect to the UEs in different states, which may lead to simplification of the overall system design in some of the present embodiments.

CASE 5: The structure of an SI Request Message:

In one implementation, the SI request message in the MSG3 (e.g., in an MSG3-based SI request procedure) may be the same for idle, inactive, and connected states. Different minimum granularity of the requested SI (e.g., SIB-based or SI message-based) may be considered in connection with the SI request message. For example, it may be beneficial for the SI request message to use SI message-based granularity (e.g., the UE indicates which SI message(s) is requested) in the MSG3-based SI request procedure, since there is a one-bit indicator in the NR SIB1 to show whether the corresponding SI message is currently broadcasted or not, and the number of SI messages may be much less than the number of SIBs. However, the SI message-based granularity may not provide sufficient information to the NW in regards to which SIB(s) needs to be broadcasted and/or whether the mapping of the SIB(s) and the SI message(s), and the associated periodicity may need to be re-arranged based on the UE's requirements. The UE in connected state may receive the required SI via dedicated signaling. Therefore, in one implementation, the SIB-based granularity may be used, e.g., by the UE indicating which SIB(s) is requested.

Different implementations regarding the different SIB-based granularities will be discussed next:

CASE 5-1:

In the SI Request message, there may be a choice structure in which the UE may choose to use the SI message-based granularity or the SIB-based granularity. The UE may consider the signaling overhead to select which granularity to use. In one implementation, the UE may use a first bitmap to indicate which SI message(s) is requested and a second bitmap to indicate which SIB(s) is requested. In one implementation, there may be a common bitmap for the UE to indicate which SI message(s) is requested or which SIB ID(s) is requested.

CASE 5-2:

In the SI Request message, there may be a choice structure in which the UE may choose to use the SI message-based granularity or the SIB-based granularity. The UE may select one of the two types of granularity based on the NW configuration. The NW configuration may be delivered to the UE via dedicated signaling or via broadcasting. In one implementation, the UE may use a first bitmap to indicate which SI message(s) is requested and a second bitmap to indicate which SIB(s) is requested. In one implementation, there may be a common bitmap for the UE to indicate which SI message(s) is requested or which SIB ID(s) is requested.

CASE 5-3:

In the SI Request message, in some of the present embodiments, the UE may request one or more SI messages together with one or more SIBs. For example, both SI message-based granularity and SIB-based granularity may be potentially used in the SI Request message. Specifically, a UE may send an SI Request message that only uses the SI message-based granularity, only uses the SIB-based granularity, or uses both SI message-based granularity and SIB-based granularity. The UE may use a first bitmap to indicate which SI message(s) is requested and a second bitmap to indicate which SIB(s) is requested. In one implementation, there may be a common bitmap for the UE to indicate which SI message(s) is requested or which SIB ID(s) is requested.

CASE 5-4:

In some of the present embodiments, the UE may use a two-level bitmap for the SI request messages. In some of such embodiments, the first level bitmap may be used for the SI-based granularity, which may be mandatorily appended in the SI request message. The second level bitmap may be used for the SIB-based granularity, which may be optionally appended in the SI request message if the corresponding SI bit is set to "1" in the first level bitmap. As an example, in which there are 5 SI messages, and the SI message #3 includes SIB #7, SIB #8, SIB #9 andSIB #10, when the UE wants to request SIB #9, the first level bitmap of the UE's SI request message may be "0100" (which indicates SI message #3), and the UE may further optionally append the second level bitmap "0100" (which indicates the third SIB in the SI message #3). Consequently, a gNB may provide SIB #9 specifically in response to such an SI request message. In one implementation, if the second bitmap does not appear, the gNB may provide the complete SI message #3.

CASE 6: On-demand SI Request Procedure in an NR-NR DC scenario:

A UE in an NR-NR Dual Connectivity (DC) mode may request one or more required SIBs or one or more SI messages for certain purpose(s) or certain service(s). Several implementations are described below regarding how the UE may request and receive the required SIB(s) from a secondary node (SN) or the serving cells in a secondary cell group (SCG).

CASE 6-1:

When a UE is in an NR-NR DC mode and one or more SIBs or one or more SI messages are required, the UE may be only allowed to send the SI request message to the master node (MN) in some of the present embodiments.

Figure 2:
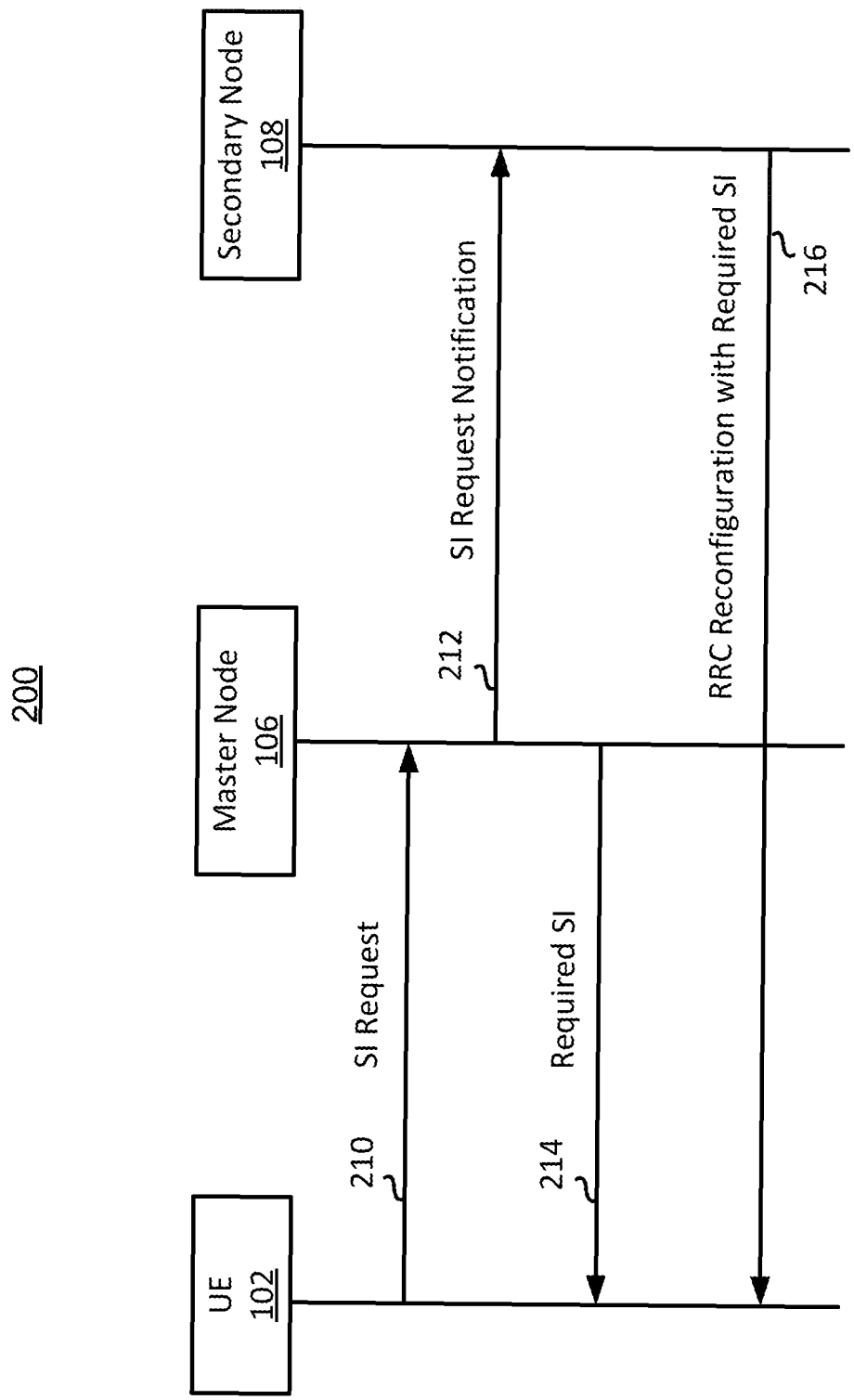
FIG. 2 is a sequence diagram illustrating an example of an on-demand SI request being transmitted to an MN in the DC mode, according to an exemplary implementation of the present application.

FIG. 2 is a sequence diagram illustrating an example of an on-demand SI request being transmitted to an MN in the DC mode, according to an exemplary implementation of the present application. As shown in diagram 200, in action 210, UE 102 may transmit an SI request message to MN 106 when UE 102 requires on-demand system information of a cell belonging to MN 106 or a cell belonging to SN 108. In action 212, MN 106 may inform SN 108 to provide the required SIB(s) or SI message(s) to UE 102 based on the SI request message. For example, MN 106 may use a signaling message between two base stations (e.g., X2-AP message or Xn-AP message) with fields indicating the requested SIB(s) or SI message(s). When SN 108 receives the SI request from MN 106, SN 108 may transmit the required SIB(s) or SI message(s) to UE 102 by initiating serving cell release and addition action in the same RRC reconfiguration message to update the SIB(s) or SI message(s) for certain, or all, serving cell(s). As shown in diagram 200, this RRC reconfiguration may be transmitted via MN 106 or transmitted via Signaling Radio Bearer 3 (SRB3), if configured.

When the UE requires on-demand system information of a cell belonging to MN 106, if the requested SI message or SIB is not broadcasted, in action 214, MN 106 may transmit the required SI to UE 102. When the UE requires on-demand system information of a cell belonging to SN 108, if the requested SI message or SIB is not provided before, in action 216, SN 108 may transmit RRC Reconfiguration with the required SI to UE 102 (e.g., via the SRB3). In one implementation, SN 108 may transmit RRC Reconfiguration with required SI (e.g., action 216) only when SN 108 receives the SI Request Notification from MN 106 (e.g., action 212).

In one implementation, SN 108 may directly transmit the modified SIB(s) or SI messages(s) to UE 102 without taking cell release and addition action, when MN 106 sends the SI Request Notification to SN 108. SN 108 may transmit the modified SIB(s) or SI messages(s) directly to UE 102 only when receiving the SI Request Notification from MN 106.

In one implementation, UE 102 is only allowed to send the SI request message to MN 106. The UE may indicate in the SI request message that the SI Request is for the SIB(s) or the SI message(s) on MN 106 or SN 108. If the SI Request message is marked for MN 106, MN 106 may be responsible for this SI Request message. On the other hand, if the SI Request message is marked for SN 108, MN 106 may forward this message to SN 108 and SN 108 may be responsible for this SI Request message. It should be noted that UE 102 may follow the minimum SI's indication (e.g., SI transmission period) of MN 106 or SN 108 to receive the SI while the SI request message is marked to MN 106 or SN 108, respectively. In another implementation, UE 102 may not mark the SI request toward MN 106 or SN 108, and MN 106 may provide all (MN 106 and SN 108) relative SI to UE 102 in a unicast approach.

If some or all of the serving cells in the SCG do not provide the requested SIB(s) or SI message(s), SN 108 may inform MN 106 that the SCG, or some serving cells in the SCG, does not provide the requested SIB(s) or SI message(s). MN 106 may decide whether to perform the SCG change action or release SN 108 for UE 102.

CASE 6-2:

When a UE in the NR-NR DC mode and one or more SIBs or SI messages are required, the UE may send the SI request message to the MN and/or the SN when required.

Figure 3:
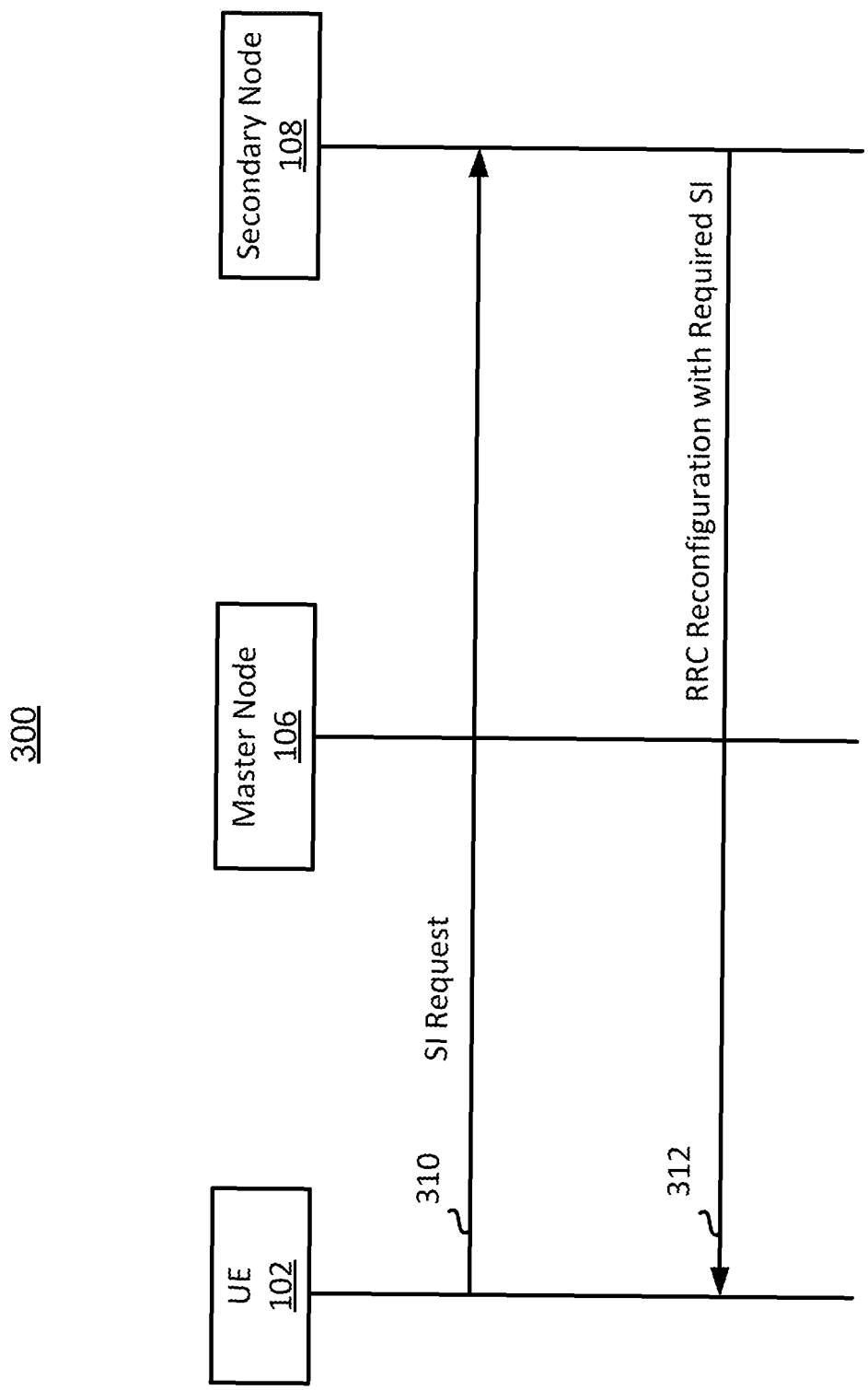
FIG. 3 is a sequence diagram illustrating an example of an on-demand SI request being transmitted to an SN in the DC mode, according to an exemplary implementation of the present application.

FIG. 3 is a sequence diagram illustrating an example of the on-demand SI request being transmitted to an SN in the DC mode, according to an exemplary implementation of the present application. As shown in diagram 300, in action 310, UE 102 may transmit the SI request message to SN 108 (e.g., via SRB3, if configured). In action 312, SN 108 may transmit RRC Reconfiguration with the required SI to UE 102 via SRB3. If SRB3 is not configured, UE 102 may transmit the SI request message to MN 106 and let MN 106 forward the SI request message to SN 108.

When some or all of the serving cells in the SCG cannot provide the required SIB(s) or SI message(s), SN 108 may inform MN 106 that the SCG, or some serving cells in the SCG, does not provide the requested SIB(s) or SI message(s). MN 106 may decide whether to perform the SCG change action or release SN 108 for UE 102.

Figure 4:
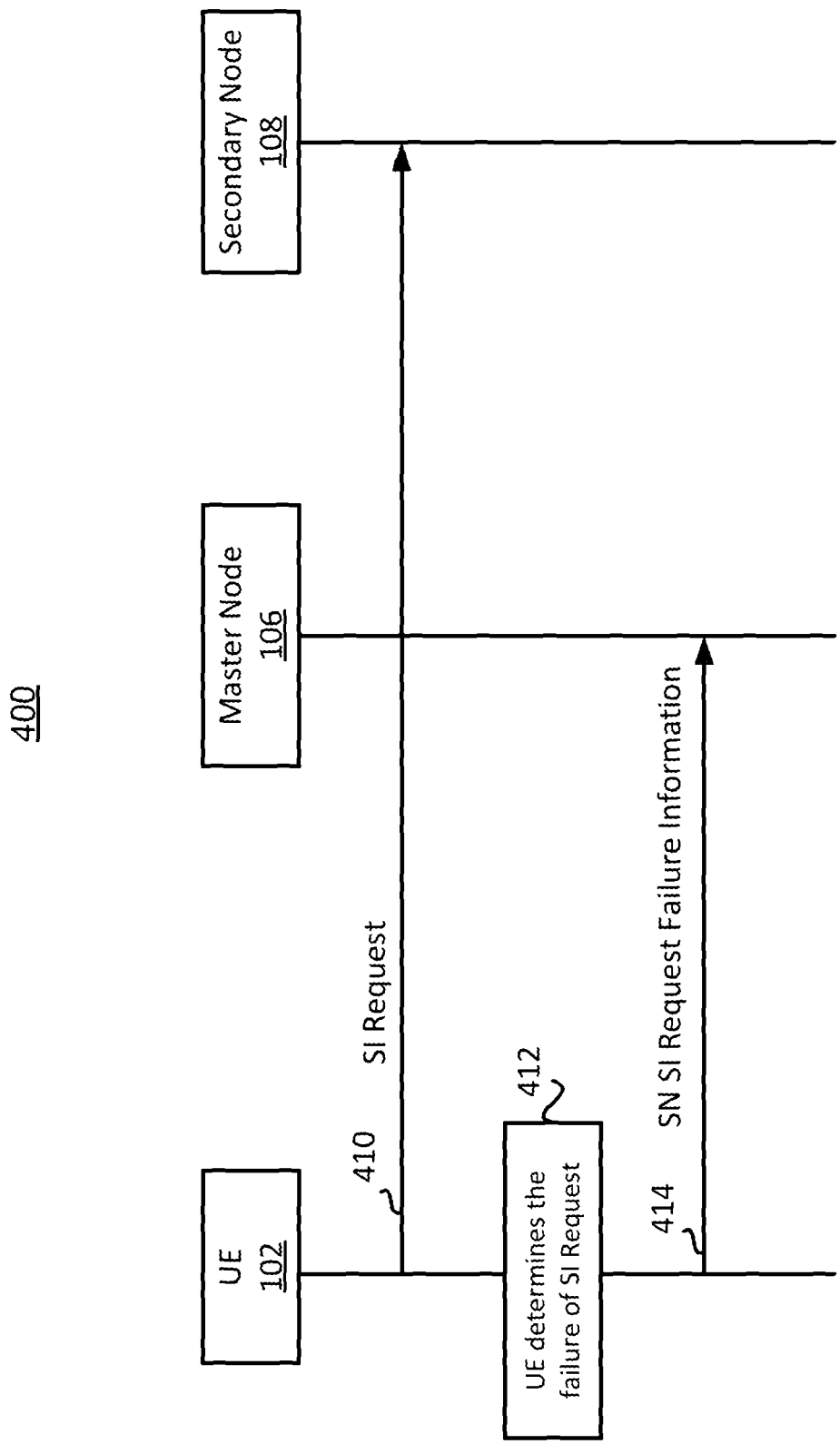
FIG. 4 is a sequence diagram illustrating an example of a UE determining the failure of an SI request in the DC mode, according to an exemplary implementation of the present application.

FIG. 4 is a sequence diagram illustrating an example of the UE determining the failure of an SI request in the DC mode, according to an exemplary implementation of the present application. As shown in diagram 400, in action 410, UE 102 sends an SI request message to SN 108. In action 412, UE 102 determines the failure of the SI request, e.g., when the number of times UE 102 transmits the random access preamble reaches a threshold. After determining the on-demand SI request procedure is unsuccessful, UE 102 may store the SI request failure information related to SN 108. In action 414, UE 102 may transmit the SN SI request failure information to MN 106.

Figure 5:
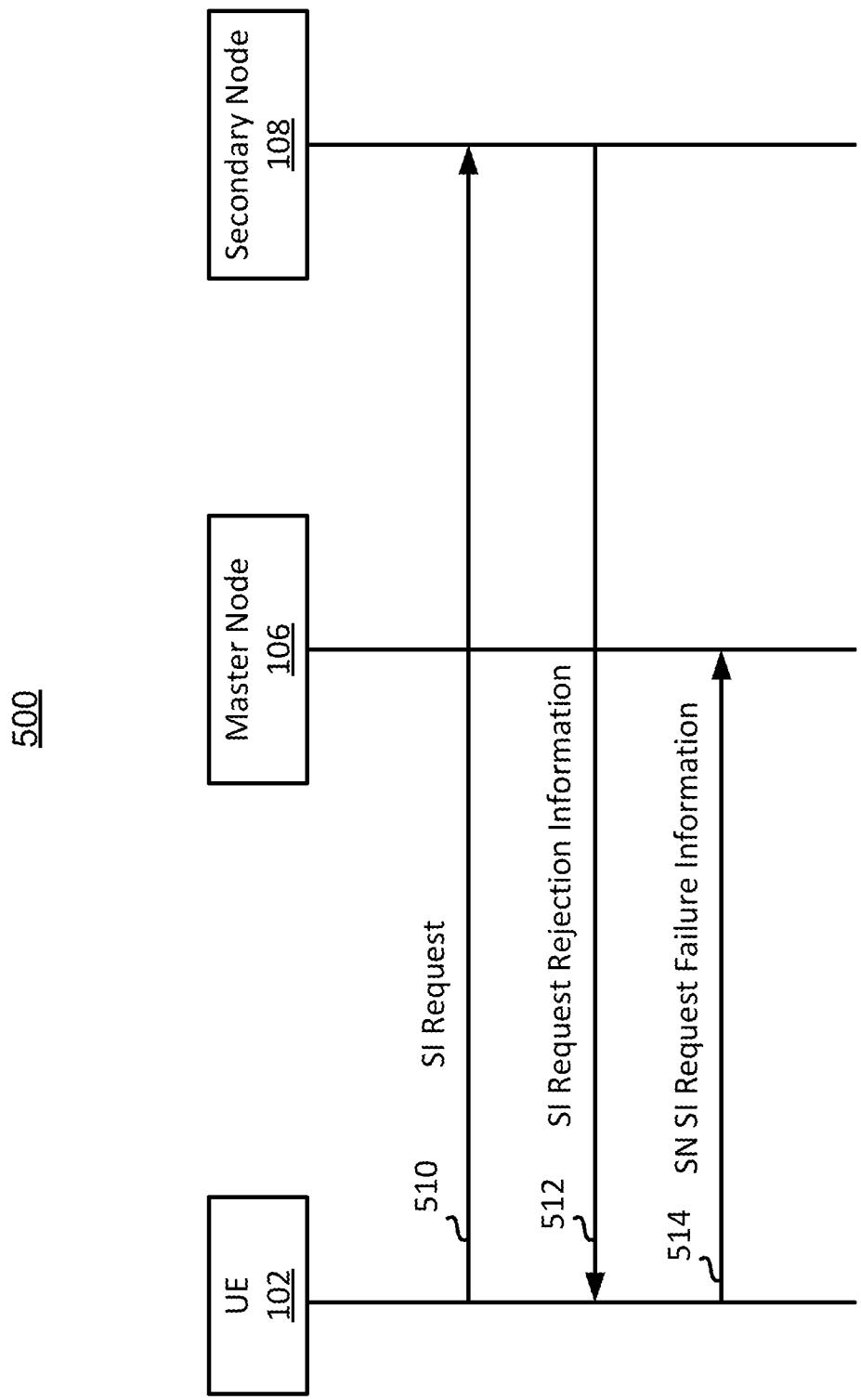
FIG. 5 is a sequence diagram illustrating an example of a UE receiving SI request rejection information in the DC mode, according to an exemplary implementation of the present application.

FIG. 5 is a sequence diagram illustrating an example of the UE receiving SI request rejection information in the DC mode, according to an exemplary implementation of the present application. As shown in diagram 500, in action 510, UE 102 sends an SI request message to SN 108. In action 512, UE 102 receives the SI request rejection information from SN 108. After determining the on-demand SI request procedure is unsuccessful, UE 102 may store the SI request failure information related to SN 108. In action 514, UE 102 may send the SN SI request failure information to MN 106.

If UE 102 determines that the SI request procedure on SN 108 has failed (e.g., action 412 in diagram 400 or action 512 in diagram 500), UE 102 may inform MN 106 of the cause of SN SI request failure or the information related to SN SI request failure (e.g., by sending an SN SI Request Failure Information when the on-demand SI request for the SIB(s) of SN 108 is rejected or failed, e.g., in action 414 of diagram 400, or action 514 of diagram 500). The information of the SI request failure may include at least one of the following: the required SIB(s), the required SI message(s), the cell ID (of the cell which the UE preforms SI procedure but failed), SSB Index(s) (Synchronization Signal Block Index(s)) to perform SI request, the failed SI request procedure type (e.g., MSG1-based or MSG3-based), or the timestamp (e.g., when to perform the SI request procedure). After MN 106 receives the cause of the SI request failure or the information related to the SI request failure, MN 106 may resolve the SN SI request rejection/failure problem. For example, MN 106 may release SN 108 or change SN 108 to a new SN for UE 102.

CASE 7: An RA Problem caused by the MSG1-based/MSG3-based SI request procedure:

A UE in connected state may be allowed to apply an MSG1-based SI request procedure and/or an MSG3-based SI request procedure. In one implementation, if the RA problem is caused by the MSG1-based or the MSG3-based SI request procedures, the UE's operation in connected state is not affected if the requested SI message(s) or SIB(s) is not essential for the UE to perform the targeting services.

In one implementation, the UE may still be fine even if the requested SIB(s) or SI message(s) is not received from the serving node (e.g., in a single connectivity mode) or the MN (e.g., in dual connectivity mode) (e.g., the requested SIB or SI message may not be essential). In this scenario, the UE may not consider the RA problem as a normal radio link failure, and the UE may not perform a re-establishment procedure, or enter into an idle state.

In one implementation, the UE may still be fine even if the requested SIB(s) or SI message(s) is not received from the SN (e.g., in a dual connectivity mode). In this scenario, the UE may not consider the RA problem as a normal radio link failure, and the UE may report the SI failure information to the MN. For example, when the RA problem is reported and the upper layer (e.g., the RRC layer) knows that the problem is caused by an SI request, the UE may initiate a transmission of the SI failure information report to the MN. In this implementation, the UE may not suspend all of the SCG data radio bearers (DRBs) or SCG transmission for the split DRBs or the duplication DRBs. Also, the UE may not reset the MAC entity associated with the SCG (or SN).

In one implementation, the UE may still be fine even if the requested SIB(s) or SI message(s) is not received from the SN (e.g., in a dual connectivity mode). In this scenario, the UE may not consider the RA problem as a normal radio link failure, and the UE may not report the SI failure information to the MN. For example, when the RA problem is reported and the upper layer (e.g., RRC layer) knows that the problem is caused by an SI request, the UE may not initiate a transmission of the SI failure Information report to the MN. In this implementation, the UE may not suspend all of the SCG DRBs or SCG transmission for the split DRBs or the duplication DRBs. Also, the UE may not reset the MAC entity associated with the SCG (or SN). When the upper layer (e.g., the RRC layer) receives the RA problem caused by the SI request from the lower layer (e.g., the MAC layer), it may also inform the NAS layer (or the application layer) so that the NAS layer (or the application layer) does not trigger the SI request procedure for one or more required SIBs on the same cell, or not trigger the SI request procedure for a while (which may follow the NW configuration or a predefined period). How to handle the SI request failure condition may depend on the UE's implementation, if the NAS layer (or the application layer) is informed about the SI request failure.

In one implementation, whether the SN initiates the transmission of the SI failure information report to the MN may depend on the NW configuration.

Figure 6:
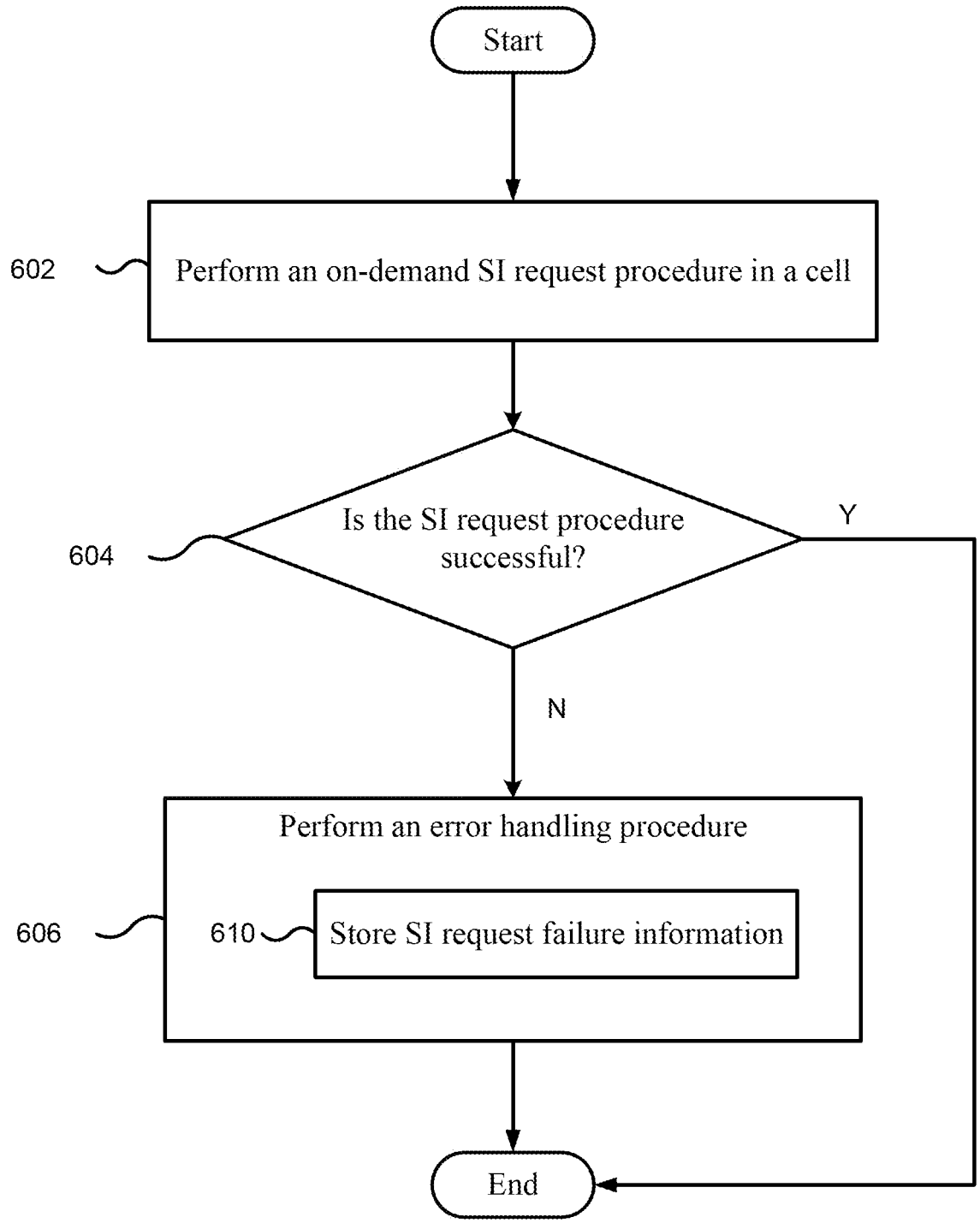
FIG. 6 is a flowchart for a method of wireless communications performed by a UE, according to an example implementation of the present application.

FIG. 6 is a flowchart for a method of wireless communications performed by a UE, according to an example implementation of the present application. In FIG. 6, the process/method 600 includes actions 602, 604, 606, and 610.

In action 602, the UE may perform an on-demand system information request procedure in a cell. The UE may be in idle, inactive, or connected state. In addition, the UE may be in a single connectivity mode or a dual connectivity mode.

In action 604, the UE may determine whether the on-demand SI request procedure is successful. In one implementation, the on-demand SI request procedure is considered unsuccessful when the number of times the UE transmits a random access preamble reaches a threshold, and/or the UE receives the SI request rejection information. If the process 600 determines, in action 604, that the SI request procedure is unsuccessful, the UE may proceed to action 606. On the other hand, if the request procedure is successful, the process 600 may end.

In action 606, the UE may perform an error handling procedure corresponding to the on-demand SI request procedure. There may be several implementations regarding the error handling procedure in different implementations. In one implementation, the error handling procedure may include action 610, in which the UE may store the SI request failure information. For example, the SI request failure information may include one or more parameters used in the on-demand SI request procedure. In one implementation, the error handling procedure may further include at least one of following: a prohibit timer activation, a cell re-selection procedure, and a re-establishment procedure.

Figure 7:
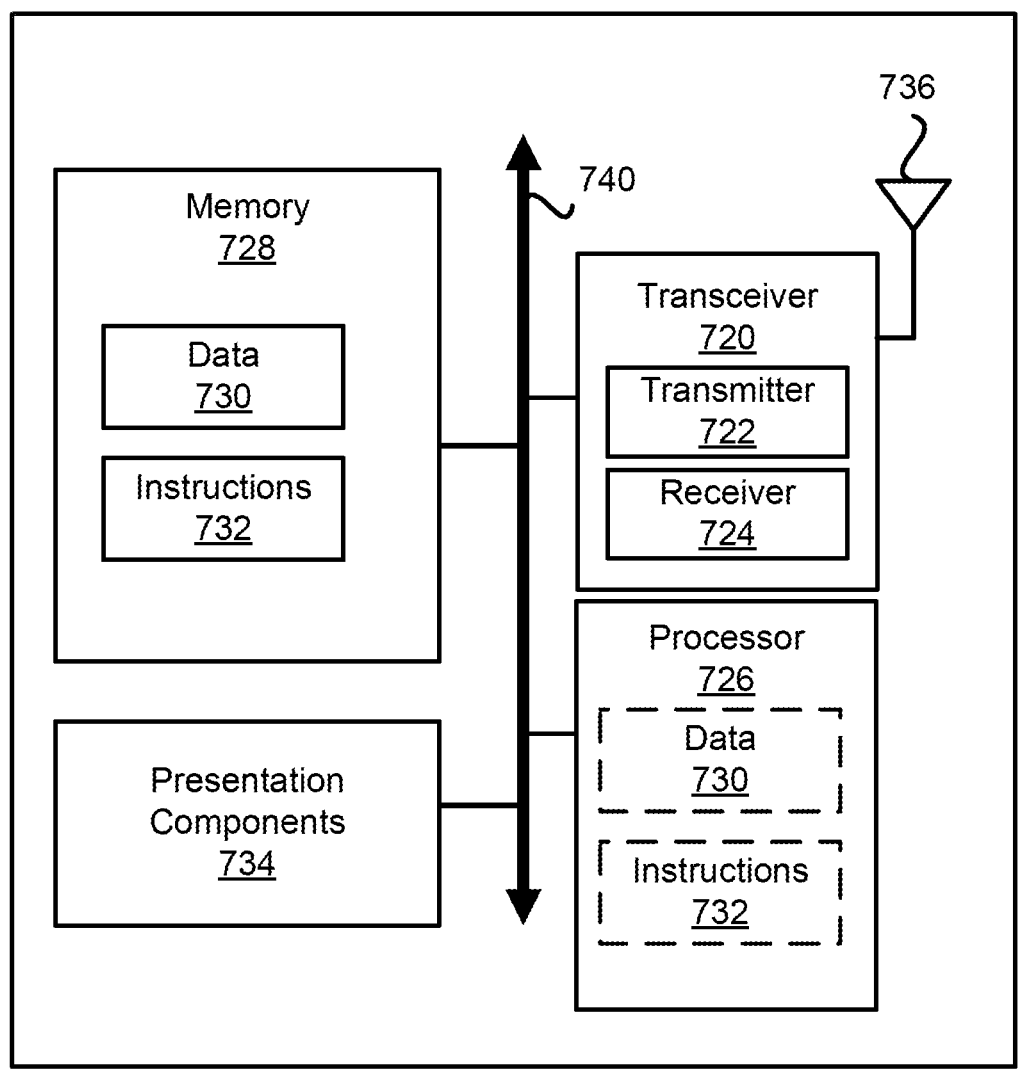
FIG. 7 illustrates a block diagram of a node for wireless communication, in accordance with various aspects of the present application.

FIG. 7 illustrates a block diagram of a node for wireless communication, in accordance with various aspects of the present application. As shown in FIG. 7, node 700 may include transceiver 720, processor 726, memory 728, one or more presentation components 734, and at least one antenna 736. Node 700 may also include a Radio Frequency (RF) spectrum band module, a base station communications module, a network communications module, and a system communications management module, input/output (I/O) ports, I/O components, and power supply (not explicitly shown in FIG. 7). Each of these components may be in communication with each other, directly or indirectly, over one or more buses 740.

Transceiver 720 having transmitter 722 and receiver 724 may be configured to transmit and/or receive time and/or frequency resource partitioning information. In some implementations, transceiver 720 may be configured to transmit in different types of subframes and slots including, but not limited to, usable, non-usable and flexibly usable subframes and slot formats. Transceiver 720 may be configured to receive data and control channels.

Node 700 may include a variety of computer-readable media. Computer-readable media can be any available media that can be accessed by node 700 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 728 may include computer-storage media in the form of volatile and/or non-volatile memory. Memory 728 may be removable, non-removable, or a combination thereof. Exemplary memory includes solid-state memory, hard drives, optical-disc drives, and etc. As illustrated in FIG. 7, memory 728 may store computer-readable, computer-executable instructions 732 (e.g., software codes) that are configured to, when executed, cause processor 726 to perform various functions described herein, for example, with reference to FIGS. 1 through 6. Alternatively, instructions 732 may not be directly executable by processor 726 but be configured to cause node 700 (e.g., when compiled and executed) to perform various functions described herein.

Processor 726 may include an intelligent hardware device, e.g., a central processing unit (CPU), a microcontroller, an ASIC, and etc. Processor 726 may include memory. Processor 726 may process data 730 and instructions 732 received from memory 728, and information through transceiver 720, the base band communications module, and/or the network communications module. Processor 726 may also process information to be sent to transceiver 720 for transmission through antenna 736, to the network communications module for transmission to a core network.

One or more presentation components 734 presents data indications to a person or other device. Exemplary one or more presentation components 734 include a display device, speaker, printing component, vibrating component, and etc.

From the above description, it is manifest that various techniques can be used for implementing the concepts described in the present application without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A user equipment (UE), comprising:
    one or more non-transitory computer-readable media having computer-executable instructions embodied thereon; and
    at least one processor coupled to the one or more non-transitory computer-readable media, and configured to execute the computer-executable instructions to:
    transmit a first system information (SI) request message to a base station (BS) on a signaling radio bearer 1 (SRB1) after determining that the UE is in a connected state, the first SI request message indicating at least one requested system information block (SIB);
    transmit a second SI request message to the BS on a signaling radio bearer 0 (SRB0) after determining that the UE is not in the connected state, the second SI request message indicating at least one requested SI message; and
    perform an error handling procedure after determining that the at least one requested SIB is not received successfully, or after determining that the at least one requested SI message is not received successfully.

2. The UE of claim 1, wherein the error handling procedure comprises storing SI request failure information.

3. The UE of claim 2, wherein the at least one processor is further configured to execute the computer-executable instructions to:
    transmit the SI request failure information.

4. The UE of claim 2, wherein the SI request failure information indicates at least one of:
    one or more SIBs of the at least one requested SIB;
    one or more SI messages of the at least one requested SI message;
    a cell identifier (ID) of a cell in which the UE performs an on-demand SI request procedure;
    a synchronization signal block (SSB) index for performing the on-demand SI request procedure;
    a message type of the on-demand SI request procedure, the message type including an MSG1-based approach and an MSG3-based approach; and
    a timestamp for performing the on-demand SI request procedure.

5. The UE of claim 2, wherein the at least one processor is further configured to execute the computer-executable instructions to:
    transmit the SI request failure information to a master node when the UE is in a dual connectivity mode.

6. The UE of claim 1, wherein, when the UE is not in the connected state, the error handling procedure comprises:
    considering a cell in which the UE performs an on-demand SI request procedure as barred; and
    performing a cell re-selection procedure.

7. The UE of claim 1, wherein, when the UE is in the connected state, the error handling procedure comprises activating a prohibit timer.

8. The UE of claim 1, wherein the at least one processor is further configured to execute the computer-executable instructions to:
    activate a prohibit timer after transmitting the first SI request message.

9. The UE of claim 8, wherein the at least one processor is further configured to execute the computer-executable instructions to:
    transmit a third SI request message to the BS on the SRB1 upon an expiration of the prohibit timer.

10. The UE of claim 1, wherein, when the UE is in a dual connectivity mode, the at least one processor is further configured to execute the computer-executable instructions to:
    transmit a third SI request message to a master node when the UE requires SI of a secondary node.

11. A method of performing an on-demand system information (SI) request procedure by a user equipment (UE), the method comprising:
    transmitting a first SI request message to a base station (BS) on a signaling radio bearer 1 (SRB1) after determining that the UE is in a connected state, the first SI request message indicating at least one requested system information block (SIB);
    transmitting a second SI request message to the BS on a signaling radio bearer 0 (SRB0) after determining that the UE is not in the connected state, the second SI request message indicating at least one requested SI message; and
    performing an error handling procedure after determining that the at least one requested SIB is not received successfully, or after determining that the at least one requested SI message is not received successfully.

12. The method of claim 11, wherein the error handling procedure comprises storing SI request failure information.

13. The method of claim 12, further comprising:
    transmitting the SI request failure information.

14. The method of claim 12, wherein the SI request failure information indicates at least one of:
    one or more SIBs of the at least one requested SIB;
    one or more SI messages of the at least one requested SI message;
    a cell identifier (ID) of a cell in which the UE performs the on-demand SI request procedure;
    a synchronization signal block (SSB) index for performing the on-demand SI request procedure;

a message type of the on-demand SI request procedure, the message type including an MSG1-based approach and an MSG3-based approach; and a timestamp for performing the on-demand SI request procedure.

15. The method of claim 12, further comprising:
transmitting the SI request failure information to a master node when the UE is in a dual connectivity mode.

16. The method of claim 11, wherein, when the UE is not in the connected state, the error handling procedure comprises:

considering a cell in which the UE performs the on-demand SI request procedure as barred; and performing a cell re-selection procedure.

17. The method of claim 11, wherein, when the UE is in the connected state, the error handling procedure comprises activating a prohibit timer.

18. The method of claim 11, further comprising:
activating a prohibit timer after transmitting the first SI request message.

19. The method of claim 18, further comprising:
transmitting a third SI request message to the BS on the SRB1 upon an expiration of the prohibit timer.

20. The method of claim 11, wherein, when the UE is in a dual connectivity mode, the method further comprises:

transmitting a third SI request message to a master node when the UE requires SI of a secondary node.

* * * * *